(12) United States Patent
Lu et al.

(10) Patent No.: US 9,193,536 B2
(45) Date of Patent: Nov. 24, 2015

(54) FEEDING DEVICE

(71) Applicant: HON HAI PRECISION INDUSTRY CO., LTD., New Taipei (TW)

(72) Inventors: Jian-Qiang Lu, Shenzhen (CN);
Jian-Hua Xu, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 148 days.

(21) Appl. No.: 13/903,138

(22) Filed: May 28, 2013

(65) Prior Publication Data

US 2014/0034451 A1 Feb. 6, 2014

(30) Foreign Application Priority Data

Aug. 3, 2012 (CN) .................... 2012 2 03829319 U

(51) Int. Cl.
*B65G 25/00* (2006.01)
*B65G 47/04* (2006.01)
*B65H 1/06* (2006.01)
*B65H 1/30* (2006.01)
*B65H 3/30* (2006.01)

(52) U.S. Cl.
CPC *B65G 47/04* (2013.01); *B65H 1/06* (2013.01); *B65H 1/30* (2013.01); *B65H 3/30* (2013.01); *B65H 2405/11425* (2013.01)

(58) Field of Classification Search
CPC ....................................................... B65G 25/00

USPC ............ 198/468.01, 468.1; 219/68; 901/6, 7; 83/953; 266/65

See application file for complete search history.

(56) References Cited

U.S. PATENT DOCUMENTS

| 5,333,721 A | * | 8/1994 | Stevie | 198/418.6 |
| 6,398,004 B1 | * | 6/2002 | Kvalheim | 198/345.1 |
| 8,698,104 B2 | * | 4/2014 | Weaver et al. | 250/491.1 |
| 2010/0162958 A1 | * | 7/2010 | Kurokawa | 118/725 |

* cited by examiner

*Primary Examiner* — Gene Crawford
*Assistant Examiner* — Lester Rushin
(74) *Attorney, Agent, or Firm* — Novak Druce Connolly Bove + Quigg LLP

(57) ABSTRACT

A feeding device includes a bottom plate defining a feeding hole, at least one first feeding mechanism, and at least one second feeding mechanism. The first feeding mechanism includes a first driving member mounted on the bottom plate, a first connection member connected to the first driving member, and a plurality of first support members. The first support member is mounted on the first connection member spaced from each other along a longitudinal direction of the first connection member, for supporting the workpieces. The second feeding mechanism has a similar structure to that of the first feeding mechanism. The first connection member and the second connection member are positioned above the bottom plate adjacent to each other. Each second support member is staggeredly positioned above one corresponding first support member.

14 Claims, 4 Drawing Sheets

US 9,193,536 B2

FEEDING DEVICE

BACKGROUND

1. Technical Field

The present disclosure relates to feeding devices, and particularly to a feeding device with a predetermined usage frequency configured for use in automated production lines.

2. Description of the Related Art

In some automated production lines, products or workpieces are still fed manually to the production line. Because operators cannot control a feeding rate of the products or workpieces, a feeding frequency cannot be precisely controlled, such that other automatic devices, such as a robot, cooperating with the operators, is affected negatively.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
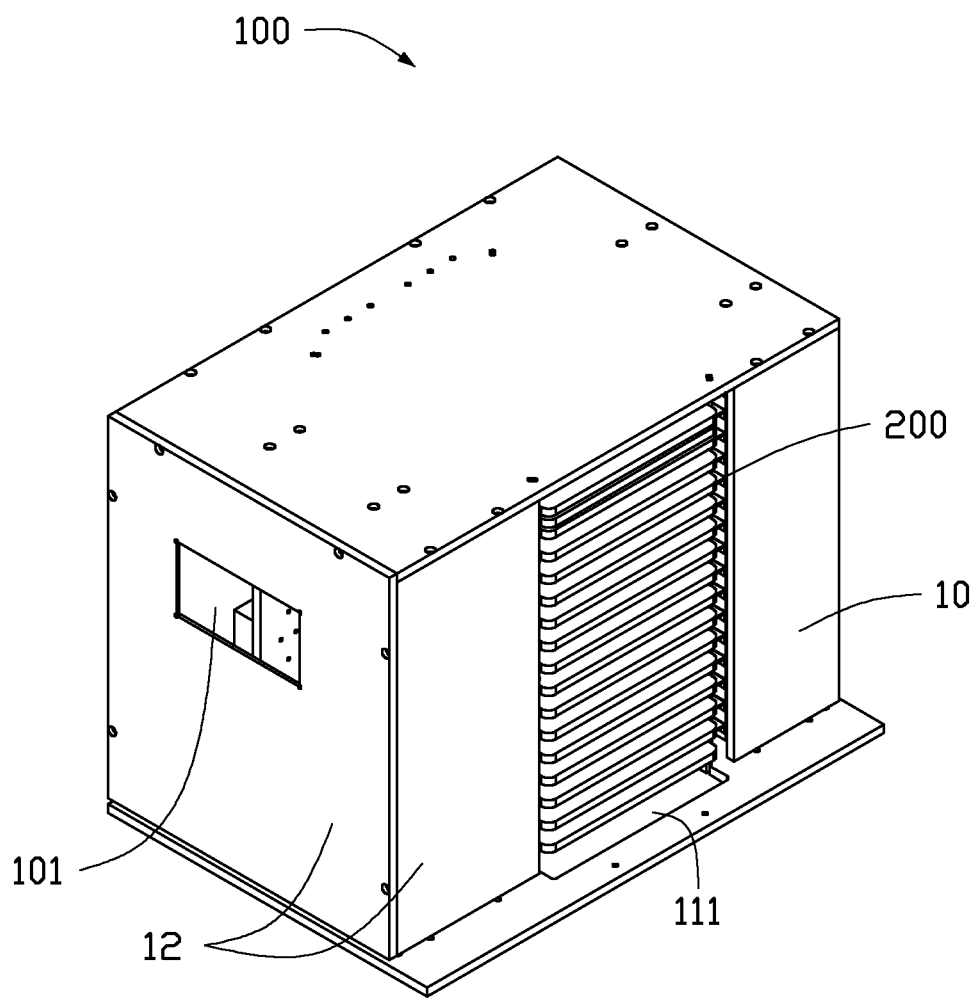
FIG. 1 is an assembled, isometric view of a feeding device of one embodiment.

FIG. 1 shows an embodiment of a feeding device 100 for transporting workpieces 200 to a production line 300 configured with a predetermined usage frequency. The production line 300 is positioned below the feeding device 100. The feeding device 100 includes a housing 10, two first feeding mechanisms 30, and two second feeding mechanisms 50.

Figure 2:
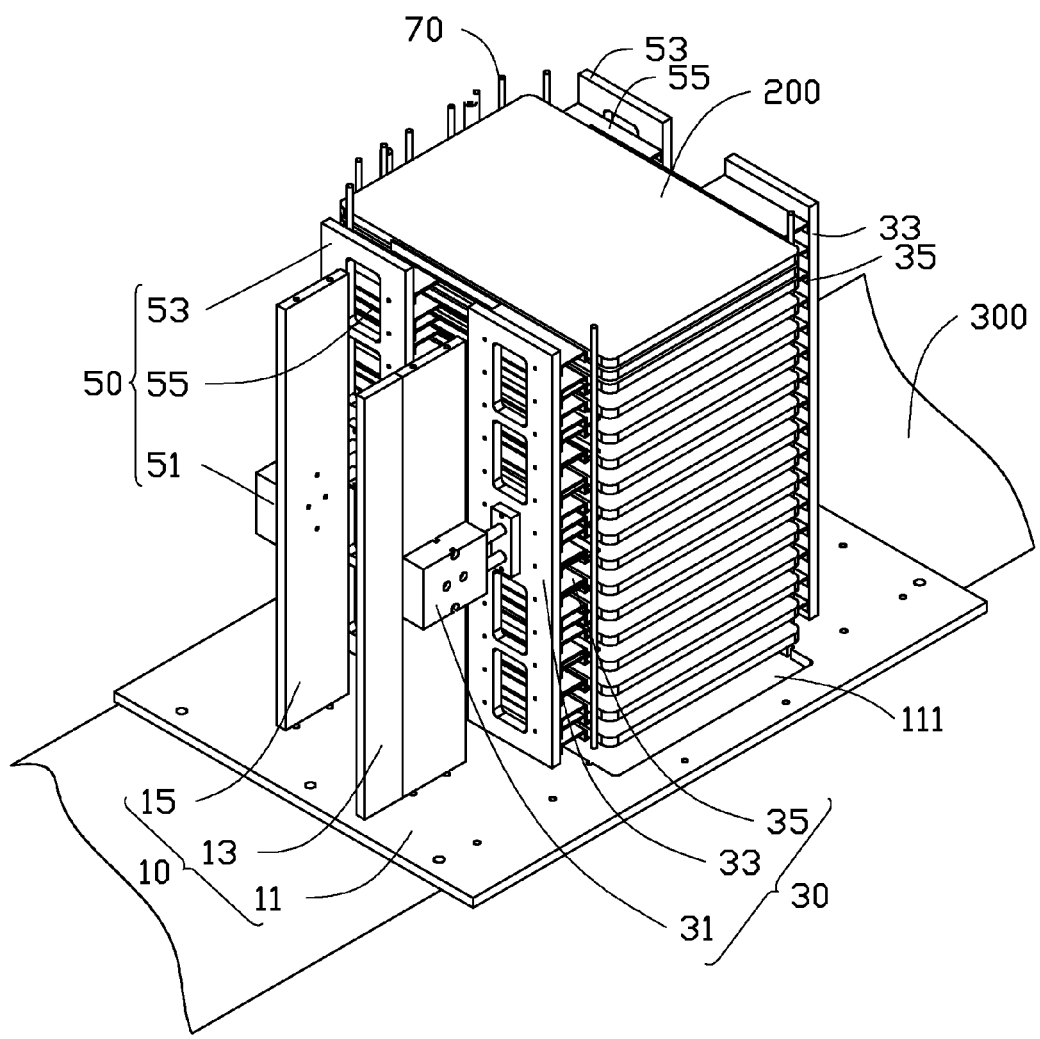
FIG. 2 is a partial, assembled, and isometric view of the feeding device of FIG. 1, including a first feeding mechanism and a second feeding mechanism.

FIG. 2 shows that the housing 10 is substantially cubic and hollow. The housing 10 includes a bottom plate 11, a plurality of side plates 12, a pair of first mounting plates 13, and a pair of second mounting plates 15. Only one first mounting plate 13 and one second mounting plate 15 are shown in FIG. 2, and the other one first mounting plate 13 and the other one second mounting plate 15 are omitted for sake of clarity. The bottom plate 11 is positioned above the production line 300, and defines a feeding hole 111 corresponding to the production line 300. The side plates 12 perpendicularly extend from the edges of the bottom plate 11 toward one side of the bottom plate 11. The side plates 12 and the bottom plate 11 cooperatively define a receiving space 101 for receiving the first feeding mechanisms 30 and the second feeding mechanisms 50. The receiving space 101 is in communication with the feeding hole 111. The two first mounting plates 13 and the two second mounting plates 15 are received in the receiving space 101. The two first mounting plates 13 are symmetrically positioned on two sides of the feeding hole 111. The two second mounting plates 15 are also symmetrically positioned on two sides of the feeding hole 111 adjacent to the corresponding first mounting plates 13.

Figure 3:
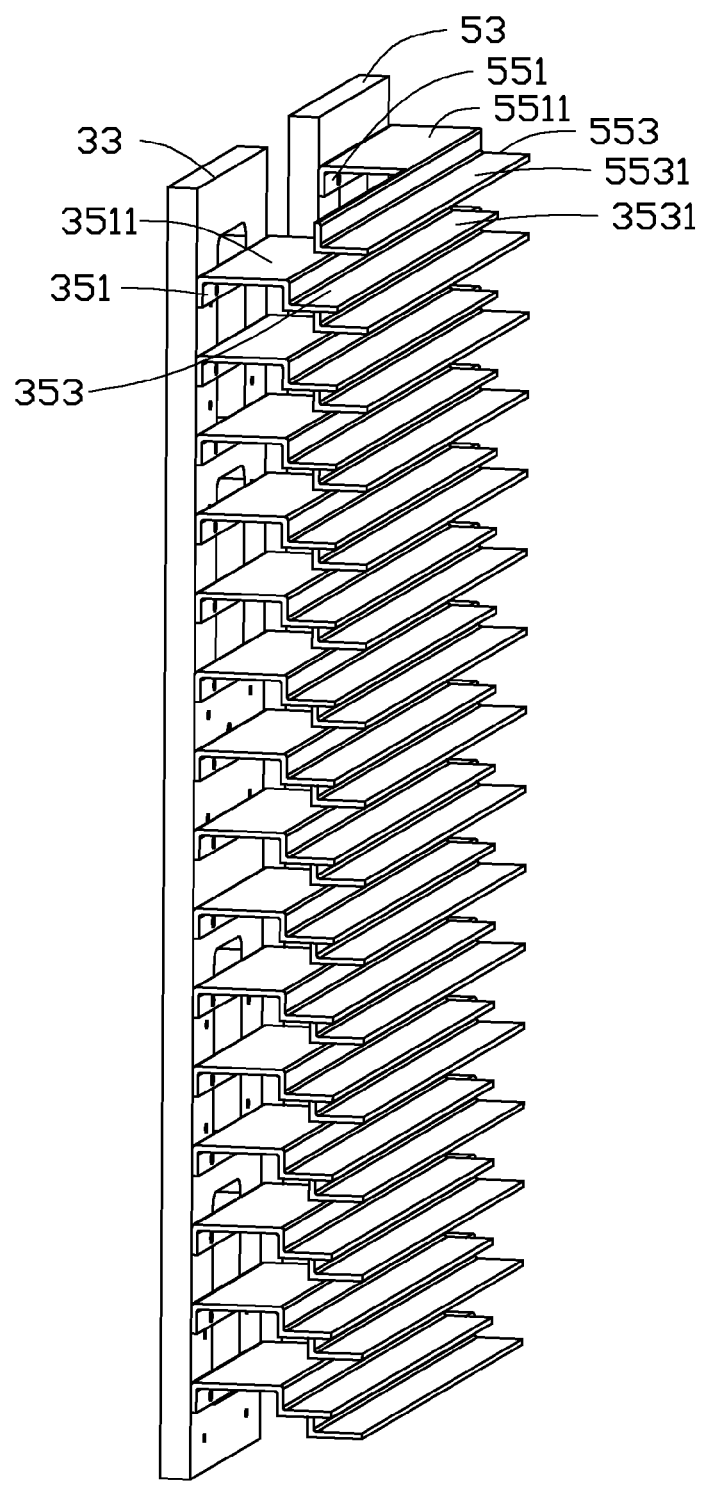
FIG. 3 is a partial, assembled, isometric view of the first feeding mechanism and the second feeding mechanism of FIG. 2, including a first support member and a second support member.
Figure 4:
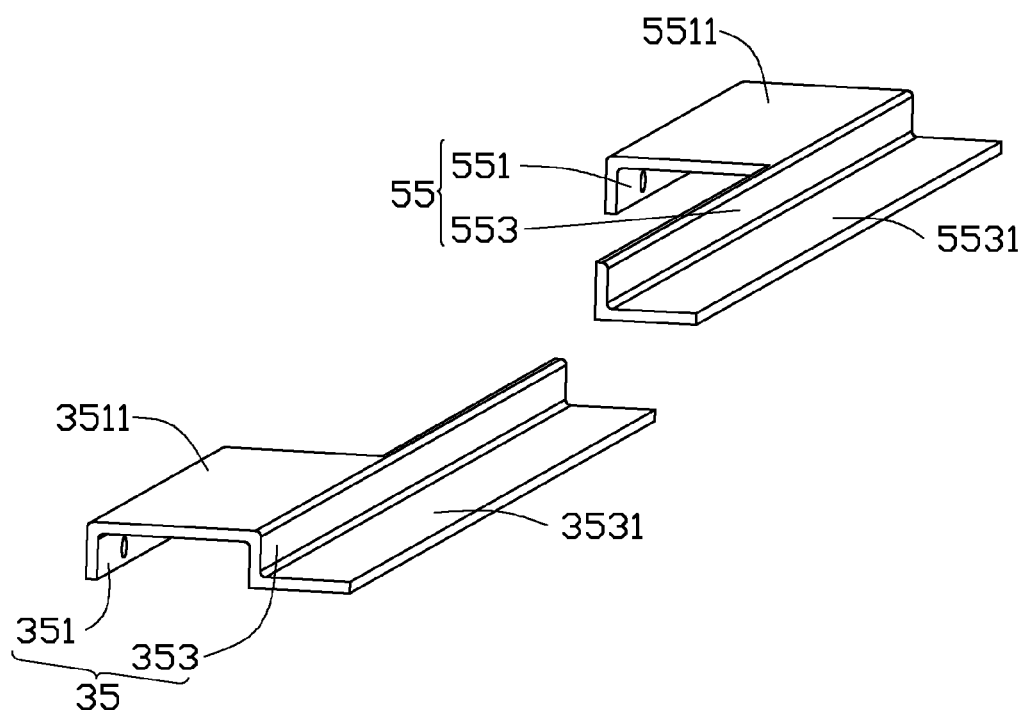
FIG. 4 is an isometric view of the first support member and the second support member of FIG. 3.

FIGS. 2 through 4 show the first feeding mechanisms 30 which are mounted on the first mounting plates 13. Each first feeding mechanism 30 includes a first driving member 31, a first connection member 33, and a plurality of first support members 35. It is noted that only the first driving member 31 of one first feeding mechanism 30 is shown in FIG. 2, and the other one first driving member 31 of the other one first feeding mechanism 30 is omitted for sake of clarity. The first driving member 31 is secured on the first mounting plate 13. The first connection member 33 is securely connected to the first driving member 31, and substantially perpendicular to the bottom plate 11. The first connection member 33 is movable relative to the first mounting plate 13 when driven by the first driving member 31. The first support members 35 are mounted on a side of the first connection member 33 away from the first driving member 31, and are vertically spaced from each other. Each first support member 35 includes a fixing portion 351 and a support portion 353 connected to the fixing portion 351. The support portion 353 is configured to support the workpiece 200. The two first feeding mechanisms 30 are mounted on the first mounting plates 13 respectively, and are opposite to each other. The first support members 35 of the two first feeding mechanisms 30 are movable in a direction toward each other or away from each other when driven by the two first driving members 31, respectively, such that the workpieces 200 are supported or carried on the first support members 35 of the two first feeding mechanisms 30, or fallen down/dropped from the first support members 35 of the two first feeding mechanisms 30.

In the illustrated embodiment, the fixing portion 351 is substantially L-shaped. One end of the fixing portion 351 is fixed to the first connection member 33. The support portion 353 is substantially L-shaped, and extends from the other end of the fixing portion 351. The fixing portion 351 includes a connecting portion 3511 connected to the support portion 353. The support portion 353 includes an arm 3531 located away from the connecting portion 3511. The arm 3531 is substantially parallel to the connecting portion 3511. Length of the arm 3531 of the support portion 353 along a longitudinal direction is greater than that of the connecting portion 3511 of the fixing portion 351. Each support portion 353 of one first feeding mechanism 30 is coplanar with one corresponding support portion 353 of the other first feeding mechanism 30, such that the support portions 353 of the two first feeding mechanisms 30 cooperatively support one workpiece 200. In other embodiments, a structure of the support portion 353 can be changed according to the structure of the workpiece 200. A structure of the fixing portion 351 can also be changed, as long as the fixing portion 351 interconnects the support portion 353 with the first connection member 33, and does not affect the movement of the support portion 353.

Each second feeding mechanism 50 is mounted on the corresponding second mounting plate 15. Each of the second feeding mechanisms 50 includes a second driving member 51, a second connection member 53, and a plurality of second support members 55. It is noted that only the second driving member 51 of one second feeding mechanism 50 is shown in FIG. 2, and the other one second driving member 51 of the other one second feeding mechanism 50 is omitted for sake of clarity. The second driving member 51 is mounted on a side of the second mounting plate 15 away from the first mounting plate 13. The second connection member 53 is connected to the second driving member 51, and substantially perpendicular to the bottom plate 11. The second connection member 53 is movable relative to the second mounting plate 15 when driven by the second driving member 51. The second support members 55 are mounted on a side of the second connection member 53 away from the second driving member 51, and are vertically spaced from each other. Each second support member 55 includes a fixing portion 551 and a support portion 553 connected to the fixing portion 551. The support portion 553 is configured to support or carry the workpiece 200.

The two second feeding mechanisms 50 are mounted on the second mounting plates 15 respectively, and are arranged opposite to each other. The second support members 55 of the two second feeding mechanisms 50 are movable toward each other or away from each other when driven by the two second driving members 51, respectively, such that the workpieces 200 are supported or carried on the second support members 55 of the two second feeding mechanisms 50, or fallen down or from the second support members 55 of the two second feeding mechanisms 50.

In the illustrated embodiment, the fixing portion 551 is substantially L-shaped. One end of the fixing portion 551 is fixed to the second connection member 53. The support portion 553 is substantially L-shaped, and extends from the other end of the fixing portion 551 toward the support portion 353 of the first support member 35 accordingly. An arm 5531 of the support portion 553 is substantially parallel to a connecting portion 5511 of the fixing portion 551. Length of the arm 5531 of the support portion 553 along a direction substantially perpendicular to the second connection member 53 is greater than that of the connecting portion 5511 of the fixing portion 551. Each support portion 553 of one second feeding mechanism 50 is coplanar with one corresponding support portion 553 of the other second feeding mechanism 50, such that the support portions 553 of the two second feeding mechanisms 50 cooperatively support one workpiece 200. In other embodiments, a structure of the support portion 553 can be changed according to that of the workpiece 200. A structure of the fixing portion 551 can also be changed, as long as the fixing portion 551 interconnects the support portion 553 with the second connection member 53, and does not affect the movement of the support portion 553.

The second support members 55 and the first support members 35 are vertically staggered relative to each other. The support portion 553 of each second support member 55 is positioned above the support portion 353 of one corresponding first support member 35. The fixing portion 551 of each second support member 55 is overlapped with the fixing portion 351 of one corresponding first support member 35.

The feeding device 100 further includes a plurality of guiding shafts 70. The guiding shafts 70 are mounted on the bottom plate 11 configured around the feeding hole 111, for guiding the workpieces 200 to be passing through the feeding hole 111.

In use, first, a first workpiece 200 is placed on top of two second support members 55. Second, the second driving members 51 of the two second feeding mechanisms 50 are started or actuated to move the two second support members 55 away from each other, then the first workpiece 200 is thereby no longer supported by the second support members 55 and falls down on top of the two first support members 35. Third, the second driving members 51 of the two second feeding mechanisms 50 are started or actuated to move the two second support members 55 toward each other, and a second workpiece 200 is then placed on top of two second support members 55, meanwhile at the same time, the first driving members 31 of the two first feeding mechanisms 30 are started or actuated to move the two first support members 35 away from each other, and then the first workpiece 200 falls down on top of the two first support members 35. By repeating the above steps for usage of the feeding device 100, the workpieces 200 can thereby be transported to the production line 300 via the feeding hole 111 one by one at the predetermined frequency or rate.

The first support members 35 and the second support members 55 support the workpiece 200 in turn when driven by the first driving member 31 and the second driving member 51, such that the workpieces 200 are fallen or dropped down onto the production line 300 one by one. The frequency or rate of the transporting speed of the workpieces 200 being dropped can be easily and accurately controlled by controlling the movement frequencies of the first support members 35 and the second support members 55.

In other embodiments, a quantity of the first feeding mechanisms 30 or the second feeding mechanisms 50 is not limited to be only two, but can be one or more than two. When only one first feeding mechanism 30 is used, the workpiece 200 can be supported by just only one support portion 353. In addition, the first mounting plate 13 and the second mounting plate 15 can be omitted, and the first driving member 31 and the second driving member 51 are directly mounted on the bottom plate 11.

It is to be understood, however, that even through numerous characteristics and advantages of the disclosure have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A feeding device for transporting workpieces to a production line, the feeding device comprising:
   a bottom plate defining a feeding hole;
   at least one first feeding mechanism comprising a first driving member mounted on the bottom plate, a first connection member connected to the first driving member, and a plurality of first support members, wherein the first support members are mounted on the first connection member, and are vertically spaced from each other, for supporting the workpieces; and
   at least one second feeding mechanism comprising a second driving member mounted on the bottom plate, a second connection member connected to the second driving member, and a plurality of second support members, wherein the first connection member and the second connection member are positioned above the bottom plate adjacent to each other, the second support members are mounted on the second connection member and are vertically spaced from each other for supporting the workpieces, the second support members and the first support members are vertically staggered relative to each other, the workpieces are supported on the first support members or dropped from the first support members to the second support members when driven by the first driving member, the workpieces are supported on the second support members or dropped from the second support members to the first support members driven by the second driving member, such that the first support members and the second support members support the workpieces in turn when driven by the first driving member and the second driving member, thus the workpieces are transported on the production line via the feeding hole one by one.

2. The feeding device of claim 1, wherein each first support member comprises a fixing portion and a support portion connected to the fixing portion, one end of the fixing portion is fixed to the first connection member, the support portion extends from the other end of the fixing portion.

3. The feeding device of claim 2, wherein the support portion is substantially L-shaped.

4. The feeding device of claim 3, wherein the fixing portion comprises a connecting portion connected to the support portion, the support portion comprises an arm located away from the connecting portion, the arm is substantially parallel to the connecting portion.

5. The feeding device of claim 4, wherein a length of the arm along a longitudinal direction thereof is greater than a length of the connecting portion of the fixing portion along the direction.

6. The feeding device of claim 5, wherein each second support member comprises a fixing portion fixed to the second connection member and a support portion connected to the fixing portion thereof.

7. The feeding device of claim 6, wherein the support portion of each second support member is substantially L-shaped.

8. The feeding device of claim 7, wherein the support portion of each second support member is positioned above the support portion of one corresponding first support member of the plurality of first support members, and the support portion of each second support member is overlapped with the support portion of one corresponding first support member of the plurality of first support members.

9. The feeding device of claim 1, wherein the feeding device further comprises at least one first mounting plate and at least one second mounting plate, the at least one first mounting plate and the at least one second mounting plate are substantially perpendicularly mounted on the bottom plate adjacent to each other, the first driving member is mounted on the at least one first mounting plate, and the second driving member is mounted on the at least one second mounting plate.

10. The feeding device of claim 1, wherein the feeding device further comprises a plurality of guiding shafts, the plurality of guiding shafts are mounted on the bottom plate around the feeding hole, for guiding the workpieces to passing through the feeding hole.

11. The feeding device of claim 1, wherein the at least one first feeding mechanism comprises two first feeding mechanism, the two first feeding mechanisms are symmetrically positioned on two sides of the feeding hole.

12. The feeding device of claim 11, wherein the at least one second feeding mechanism comprises two second feeding mechanism, the two second feeding mechanisms are symmetrically positioned on two sides of the feeding hole.

13. The feeding device of claim 11, wherein each first support portion of one of the two first feeding mechanisms is coplanar with the corresponding support portion of the other of the two first feeding mechanisms.

14. The feeding device of claim 1, wherein the feeding device further comprises a plurality of side plates perpendicularly extending from edges of the bottom plate toward one side of the bottom plate, the side plates and the bottom plate cooperatively define a receiving space for receiving the at least one first feeding mechanism and the at least one second feeding mechanism.

* * * * *